(12) United States Patent
Hymel

(10) Patent No.: US 8,819,247 B2
(45) Date of Patent: Aug. 26, 2014

(54) SYSTEM AND METHOD FOR USING A FIRST DEVICE TO COMMUNICATE DATA FROM A SECOND DEVICE

(75) Inventor: James Allen Hymel, Kitchener (CA)

(73) Assignee: BlackBerry Limited, Waterloo (CA)

( * ) Notice: Subject to any disclaimer, the term of this patent is extended or adjusted under 35 U.S.C. 154(b) by 108 days.

(21) Appl. No.: 13/466,723

(22) Filed: May 8, 2012

(65) Prior Publication Data
US 2013/0304884 A1 Nov. 14, 2013

(51) Int. Cl.
*G06F 15/16* (2006.01)

(52) U.S. Cl.
USPC ............................. 709/227; 709/245; 709/246

(58) Field of Classification Search
USPC .................................. 709/227, 228, 245, 246
See application file for complete search history.

(56) References Cited

U.S. PATENT DOCUMENTS

| | | | |
|---|---|---|---|
| 6,842,454 B2 * | 1/2005 | Metcalf, III | 370/392 |
| 7,203,733 B1 * | 4/2007 | Bern | 709/218 |
| 7,818,455 B2 | 10/2010 | Haffner | |
| 2006/0209823 A1 * | 9/2006 | Wan | 370/389 |
| 2006/0288211 A1 | 12/2006 | Vargas et al. | |
| 2009/0177783 A1 | 7/2009 | Adler et al. | |
| 2012/0036441 A1 | 2/2012 | Basir et al. | |
| 2012/0047289 A1 * | 2/2012 | Krzystofczyk et al. | 710/10 |
| 2013/0304884 A1 * | 11/2013 | Hymel | 709/222 |

FOREIGN PATENT DOCUMENTS

EP 2219354 A2 8/2010

OTHER PUBLICATIONS

Blackberry Bridge App and Blackberry Playbook Tablet Security Technical Overview; Version 2.0; Feb. 21, 2012; retrieved online Jul. 30, 2012 from http://docs.blackberty.com/en/admin/deliverables/39421/Blackberry_Bridge_and_Blackberry_Playbook_Tablet-Security_Technical_Overview.pdf.

Cremer, J.; Search Report from corresponding European Application No. 12167169.7; search completed Jul. 31, 2012.

* cited by examiner

*Primary Examiner* — Lance L Barry
(74) *Attorney, Agent, or Firm* — Brett J. Slaney; Blake, Cassels & Graydon LLP

(57) ABSTRACT

A method, device and computer readable medium are provided for enabling a communication for a second device using a first device. The method comprises detecting a first connection with the first device; obtaining from the first device via the first connection, a first set of one or more addresses and a second set of one or more identifiers associated with respective ones of the one or more addresses; detecting disconnection of the first connection with the first device; deleting the first set; enabling one or more identifiers from the second set to be associated with data to be transferred to the first device; detecting a second connection with the first device; and sending the data and associated one or more identifiers to the first device to have the first device to send the communication using corresponding one or more addresses.

20 Claims, 15 Drawing Sheets

US 8,819,247 B2

SYSTEM AND METHOD FOR USING A FIRST DEVICE TO COMMUNICATE DATA FROM A SECOND DEVICE

TECHNICAL FIELD

The following relates to systems and methods for using a first device to communicate data from a second device.

DESCRIPTION OF THE RELATED ART

Portable electronic devices are beginning to more commonly be used in pairs. For example, a user may have both a smart phone and a tablet computer and have the ability to communicably connect the two devices to each other, often referred to as "pairing," or "tethering." This tethering allows the tablet computer to access data and functionality on the smart phone and vice versa.

One problem associated with tethered devices is the potential sensitivity in providing access to some data and functionality. For example, data that is securely controlled on the smart phone may not necessarily be secure if transferred to the tablet computer and thus such data may be restricted to be used only on the smart phone or only while the devices are actively paired. These restrictions may therefore detract from the original purpose of the pairing between the devices.

BRIEF DESCRIPTION OF THE DRAWINGS

Embodiments will now be described by way of example only with reference to the appended drawings wherein.

DETAILED DESCRIPTION

Figure 1:
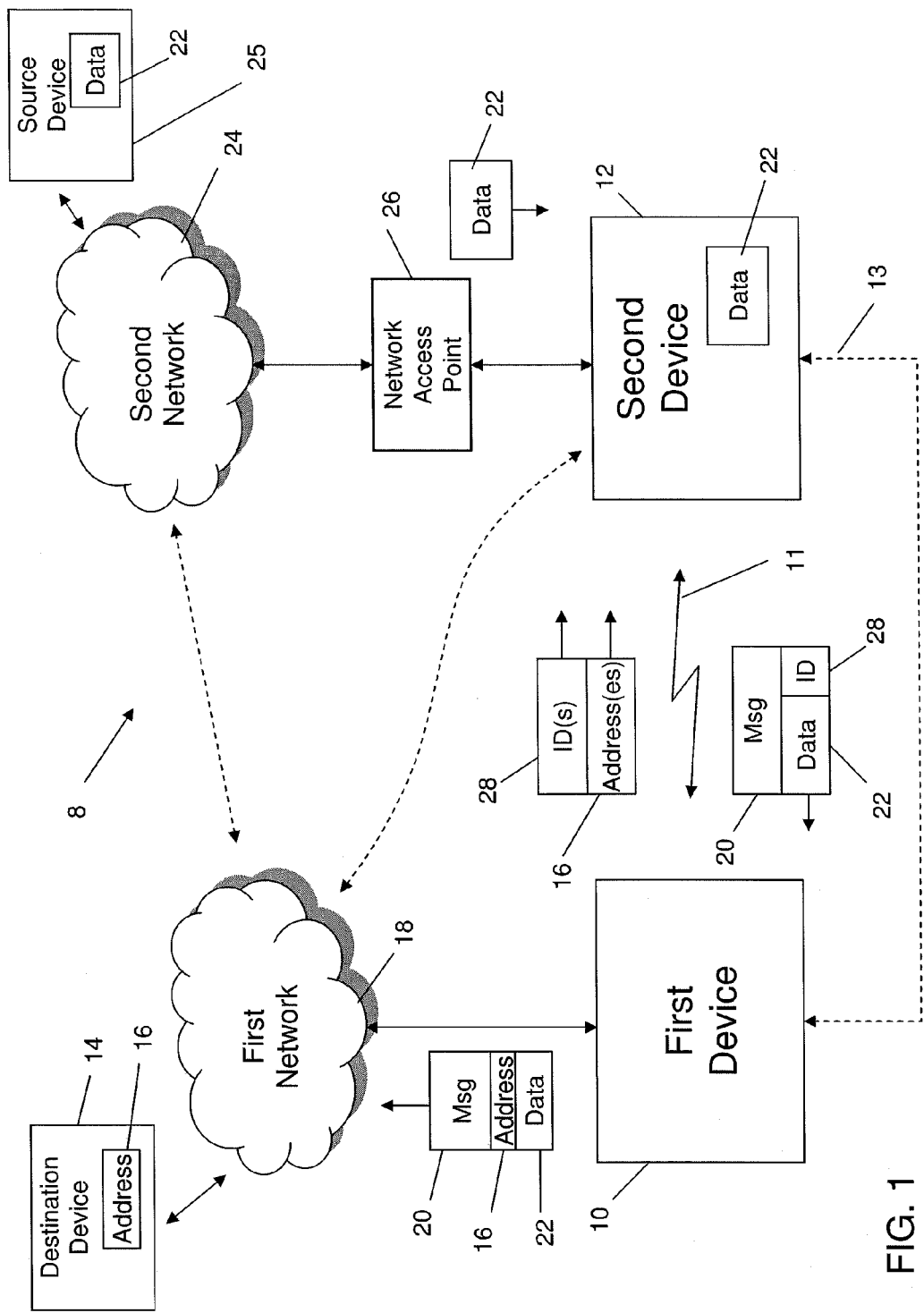
FIG. 1 is a schematic diagram of an example of a communication system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It has been recognized that to protect and/or maintain the integrity of address data shared between paired or "tethered" devices, identifiers (IDs) that enable a first device sharing the address data to recognize respective addresses, can be provided to a second device paired to the first device, in association with the address data. By providing IDs with the address data, the second device can delete the address data when not paired to the first device (to avoid potentially sensitive data from being left behind on the second device), while being able to provisionally prepare communications that can be sent using the first device when the first and second devices are subsequently paired. The provisionally prepared communications can be sent by having the first device associate an ID included in the provisional communication with a corresponding address and use the address to send the communication to the intended destination or recipient.

Turning now to FIG. 1, illustrated therein is an example of a communication system 8. In this example, the communication system 8 includes a first device 10 connectable via a wireless short range communication connection 11 to a second device 12, e.g., Bluetooth, Wi-Fi, infrared, etc. The first device 10 may also be connectable to the second device 10 via a wired communication connection 13, e.g., Ethernet, Universal Serial Bus (USB), etc.

The first device 10 is communicably connectable to a destination device 14 having an associated address 16 via a first network 18. It can be appreciated that the destination device 14 may represent an individual recipient, organization or any other entity capable of receiving an electronic communication such as a message 20, data transfer, voice communication, etc. For example, the destination device 14 may represent or otherwise include a smart phone associated with a contact known to a user of the first device 10. It can also be appreciated that the address 16 of the destination device 14 may include any information capable of enabling electronic communications to reach the destination device 14. For example, the address 16 may include, without limitation, an email address, personal identification number, resource locator such as a uniform resource locator (URL), phone number, etc. In the example shown in FIG. 1, the first device 10 is operable to send, forward, or otherwise communicate a message 20 including data 22 to the destination device 14 by accessing the first network 18 and including the address 16 associated with the destination device 14 in the message 20. It can be appreciated that the principles discussed herein may apply to any communication or transfer of data 22 and/or other information from the first device 10 to the destination device 14 and thus the message 20 shown in FIG. 1 is for illustrative purposes only. For example, the first device 10 may also communicate with the destination device 14 over a voice communication channel.

The first device 10 and the second device 12, when paired or tethered to one another, allow for one or more addresses 16 stored on or otherwise accessible to the first device 10 to be provided to the second device 12 via the communication connections 11, 13. For ease of illustration, the following examples will assume the wireless short range communication connection 11 is used. As shown in FIG. 1, the first device 10 may store corresponding IDs 28 and include these IDs 28 in messages or other data communication structures, along with the addresses 16, to enable the second device 12 to communicate with the destination device 14 while the first and second devices 10, 12 are paired with each other. It can be appreciated that the communication between the second device 12 and the destination device 14 may be performed indirectly via the first device 10, directly when the second device 12 is capable of accessing the first network 18, or indirectly via some other communication channel (e.g., via a second network 24 accessible to the second device 12 via a network access point 26 and communicable with the first network 18 as shown in FIG. 1).

The provision of such addresses 16 and identifiers 28 from the first device 10 to the second device 12 may be done so in a cryptographically secure manner, e.g., by establishing a encrypted channel between the first and second devices 10, 12. In this way, data and information on the first device 10 accessed by the second device 12 can be cryptographically protected to prevent the leakage or interception of potentially sensitive data stored by or accessible to the first device 10. It can be appreciated that the second device 12 can be operable to temporarily cache data and information accessed through the connection, pairing or "bridge" between the first and second devices 10, 12 such that particular data is deleted from the second device 12 when the pairing is disconnected or "broken". By enabling the second device 12 to store the IDs 28 after the connection between the first and second devices 10, 12 has been broken, provisional communications may be queued by the second device 12 for later delivery via the first device 10. Since the addresses 16 would have been deleted when the connection was broken with the first device 10, the second device 12 can store an ID 28 instead of the address 16 in order to generate a message 20 including the data 22 to be sent to the destination device 14 associated with the ID 28. The first device 10, by knowing or having access to a mapping or relationship between the IDs 28 and the corresponding addresses 16, can then have the message 20 sent to the destination device 14 using the appropriate address 16.

The data 22 intended to be sent to the destination device 14 by the second device 12 may originate from various sources. For example, as shown in FIG. 1, the data 22 may be generated on or otherwise find its source from the second device 12 itself. The data 22 may also be provided by and obtained from a source device 25. In the example shown in FIG. 1, the data 22 is obtained by the second device 12 accessing or sending a request to the source device 25 via the second network 24 communicable through a network access point 26 such as a Wi-Fi hotspot. It can be appreciated that the examples shown in FIG. 1 are for illustrative purposes only and the data 22 may originate from and/or be generated by other devices, entities, sources, etc. By having access to the IDs 28 even when not paired with the first device 10, the second device 12 can generate messages 20 to be queued up for later transmission so that the messages 20 can be sent to the first device 10 immediately upon re-pairing with the first device 10. In this way, the second device 12 can be used to operate in an offline mode with respect to the functionality it may inherit from the first device 10, when paired thereto.

For example, the first and second devices 10, 12 may be operated by a user in a paired mode when in a mobile setting, whereas to conserve battery power associated with maintaining the pairing, the pairing may be broken when, for example, the user is at home, the office, or other locations where the second device 12 can access the second network 24 via the network access point 26. In such a scenario, data 22 located or generated while the pairing has been broken can be shared with, e.g., the destination device 14, by queuing up a message 20 and attaching the data using the corresponding ID 16 as a destination address 16. When the pairing with the first device 10 is re-established, the first device 10 may then substitute the address 16 for the ID 28 and send the message 20 to the destination device 14. It can be appreciated that the second device 12 may utilize the first device's communication connection to the first network 18 in various ways. For example, the second device 12 may include an application that inherits the functionality of the first device 10 thus providing a "paired version" or "bridged version" of an application normally utilized on the first device 10. The second device 12 may also have a utility or application that queues up messages 20 and communicates the messages 20 to the first device 10 to have the first device 10 operate an application running thereon independently. It can be appreciated that although FIG. 1 illustrates the provision of a message 20 comprising the data 22 and ID 28 to the first device 10, the second device 12 may also be operable to send only the data 22 and ID 28 or equivalent instructions to have the first device 10 generate and/or assemble the message 20 on the first device 10 prior to delivery to the destination device 14.

Figure 2:
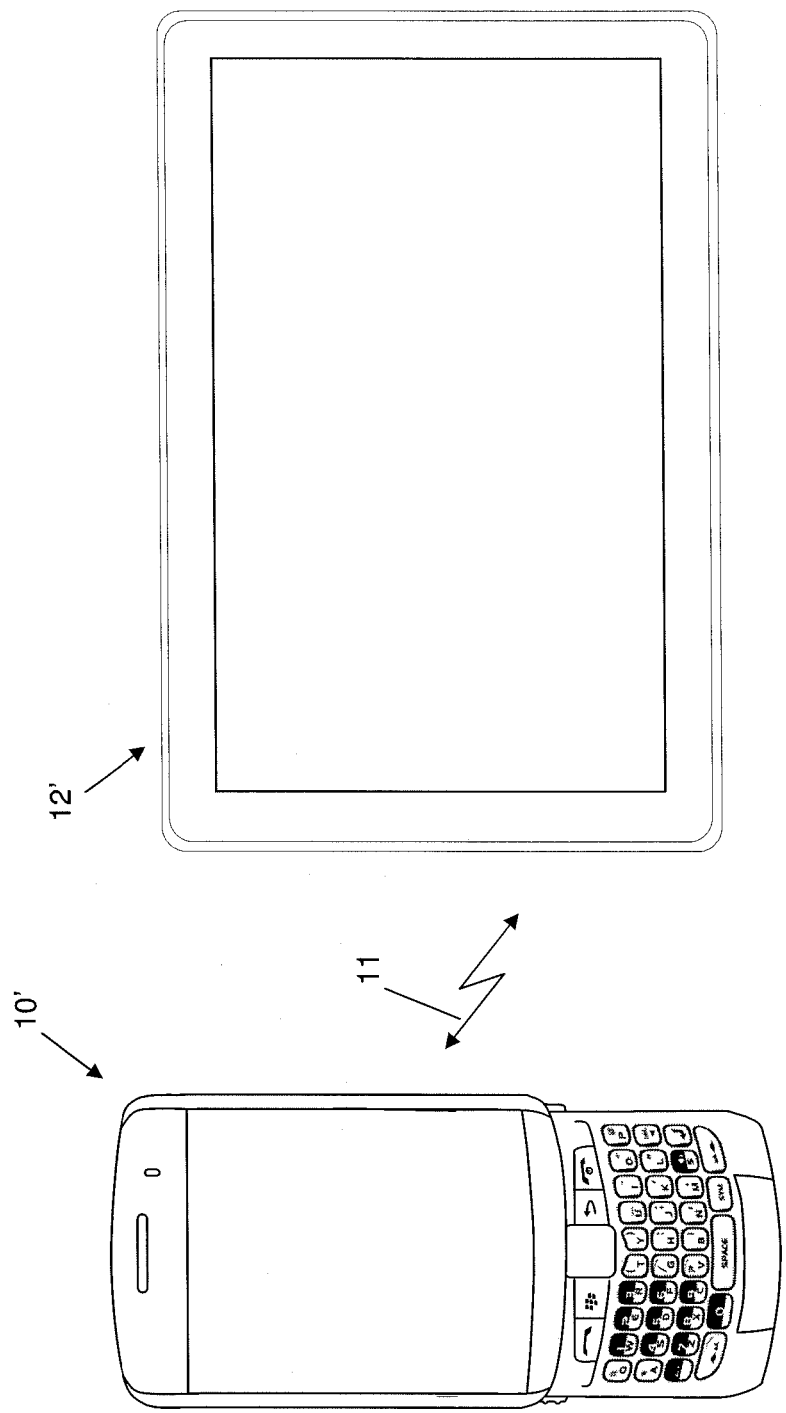
FIG. 2 is a plan view of a smart phone tethered to a tablet computer.

FIG. 2 illustrates an example of paired devices, wherein a smart phone 10' is paired with a tablet computer 12' via a wireless short range connection 11. The tablet computer 12' can be operable to connect to a Wi-Fi access point but not a cellular network and therefore by enabling a pairing with the smart phone 10', the tablet computer 12' may be used to generate data 22 and the smart phone 10' used to communicate the data 22 to a destination device 14 over the cellular network. Similarly, the tablet computer 12' may be used to access, for example, a webpage via the Internet and queue up a communication of data 22 obtained therefrom such that the data 22 can be sent to a destination device 14 using the cellular communication capabilities of the smart phone 10' at a later time. By providing both IDs 28 and addresses 16 associated with one or more destination devices 14, the tablet computer 12' can be used to obtain data 22 when not paired with the smart phone 10' while deleting the addresses 16 to protect and/or maintain data integrity, whereupon reestablishing a connection with the smart phone 10', the ID 28 included in a message 20 can be used to identify the corresponding address 16 for the intended recipient.

Figure 3:
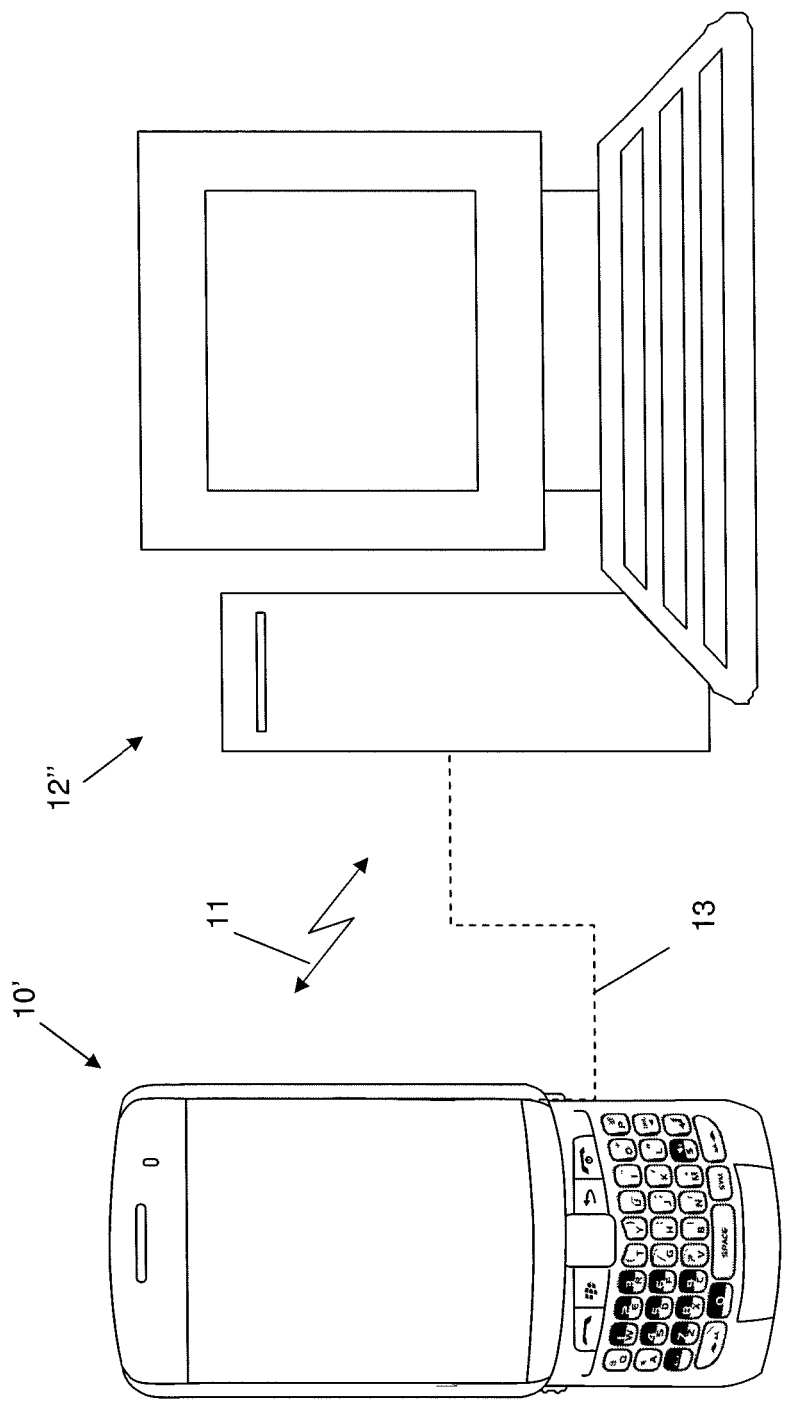
FIG. 3 is a plan view of a smart phone tethered to a desktop computer.

FIG. 3 illustrates another example of paired devices, wherein a smart phone 10' is paired with a desktop computer 12" via a wireless short range communication connection 11 or a wired communication connection 13 such as a USB cable. Similar to the example shown in FIG. 2, the desktop computer 12" can be used to access a different network than the smart phone 10' to obtain data 22, or may be used in an offline mode whereupon reestablishing a connection with the smart phone 10' data 22 obtained or generated during the offline mode can be sent via the smart phone 10'.

Figure 4:
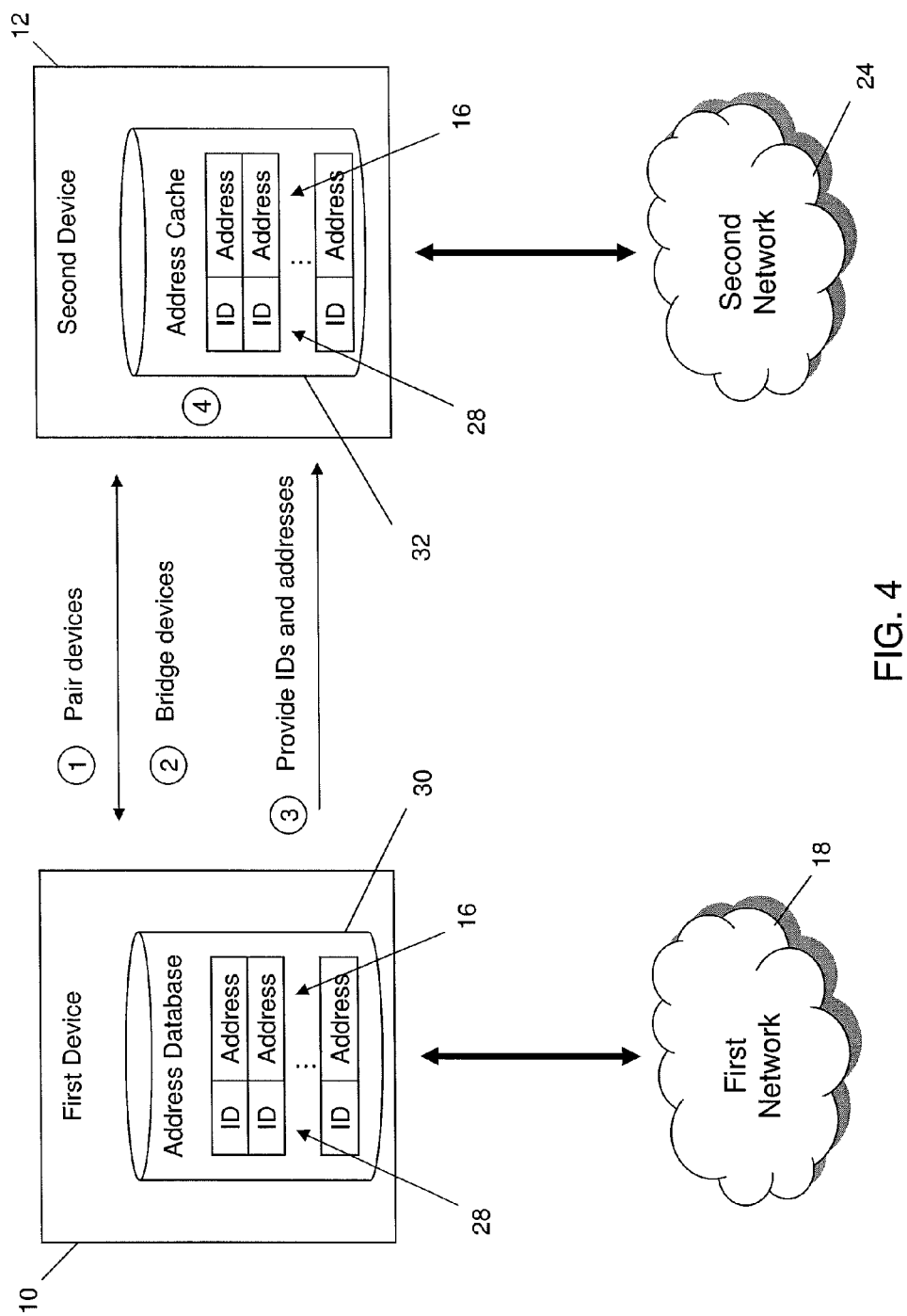
FIGS. 4 to 8 are schematic diagrams illustrating the use of a first device to communicate data from a second device.

FIGS. 4 through 8 illustrate an example set of stages that may be undertaken to have the first device 10 send data 22 obtained by the second device 12 after reestablishing a pairing therebetween. Referring first to FIG. 4, the first device 10 in this example includes an address database 30 for storing addresses 16 and corresponding IDs 28. It can be appreciated that the address database 30 may be a contact list, address book, global address lookup (GAL) database or cache, or any other memory element capable of storing the addresses 16 and IDs 28. The second device 12 in this example includes an address cache 32 for storing addresses 16 and IDs 28 provided by or accessible from the first device 10. Similar to the address database 30, the address cache 32 may include any memory element capable of storing the addresses 16 and IDs 28 and, as explained below for management of the addition and deletion of addresses 16 and IDs 28.

In stage 1, shown in FIG. 4, the first and second devices 10, 12 are paired with each other. For example, the first and second devices 10, 12 may undergo an initial Bluetooth pairing to enable the respective devices to recognize one another when within a predetermined range over the wireless short range communication connection 11. In addition to pairing the first and second devices 10, 12, the first device 10 is "bridged" with the second device 12 in stage 2. The bridging may be performed to enable applications and functionality on the first device 10 to be accessed and/or inherited on the second device 12. For example, a communication-based application on the first device 10 which is capable of sending and receiving messages 20 via the first network 18 may expose itself to the second device 12 to enable a user interface and input methods of the second device 12 to be used to interact with and operate the communication-based application on the first device 10. It can be appreciated that stages 1 and 2 are shown separately for illustrative purposes only and in other examples, pairing and bridging of the first and second devices 10, 12 may be performed in a single stage (or greater than 2 stages).

After the first and second devices 10, 12 have been paired and bridged, the first device 10, in this example, provides at least some of the IDs 28 and corresponding addresses 16 to the second device 12 in stage 3, e.g., to enable a user of the second device 12 to view entries in a contact list or address book. The second device 12 caches the addresses 16 and IDs 28 in stage 4.

Figure 5:
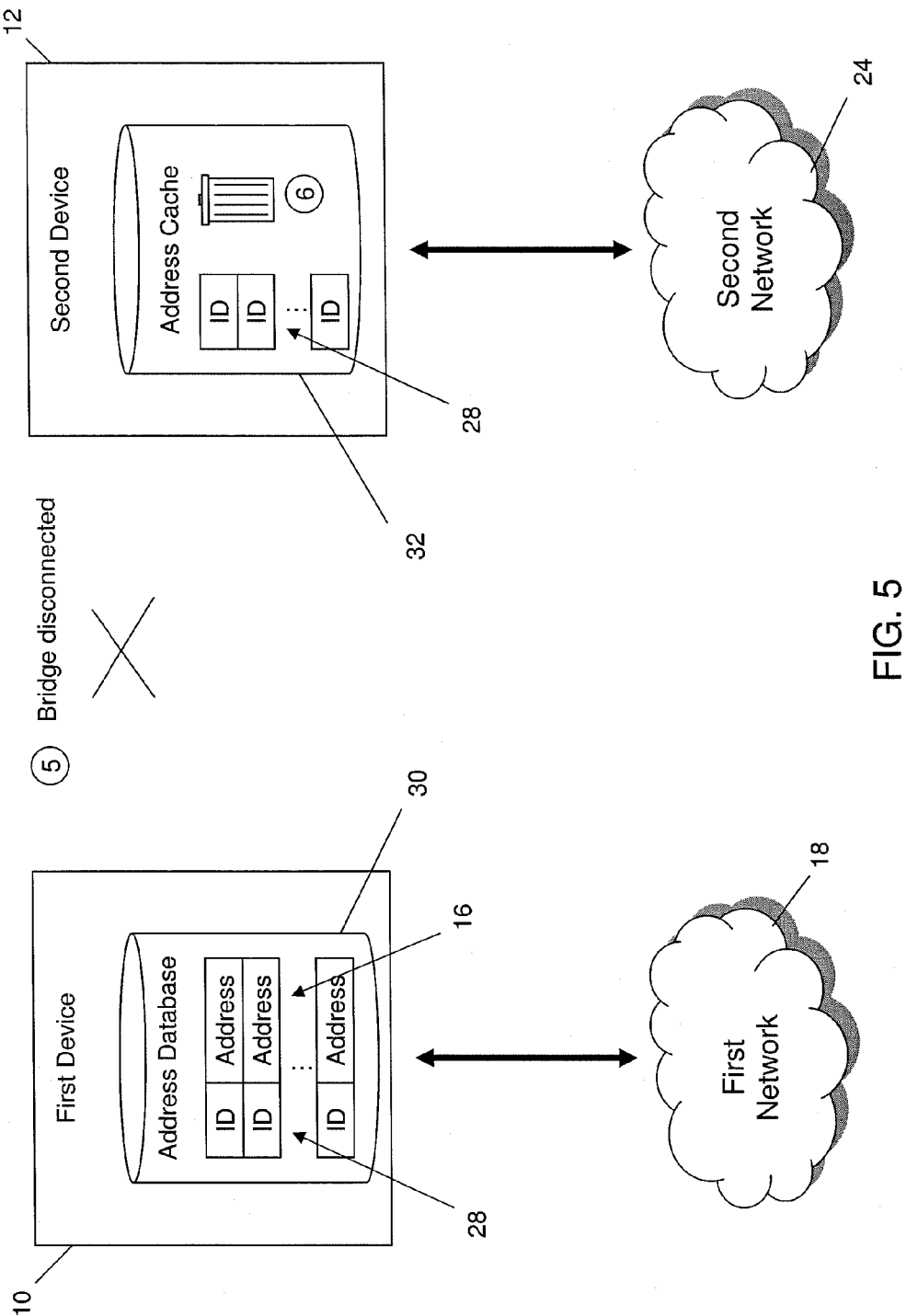
Figure 6:
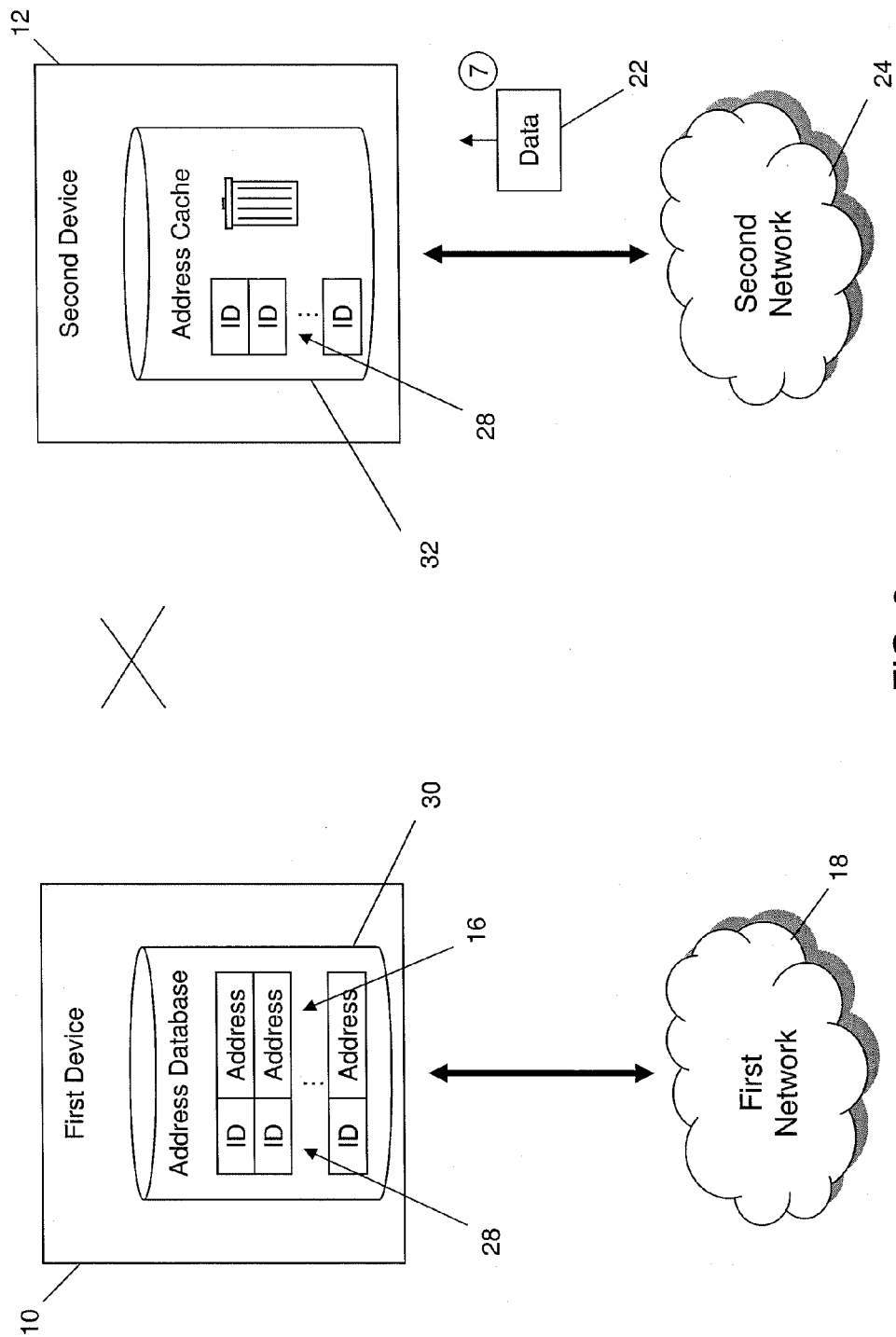
Figure 7:
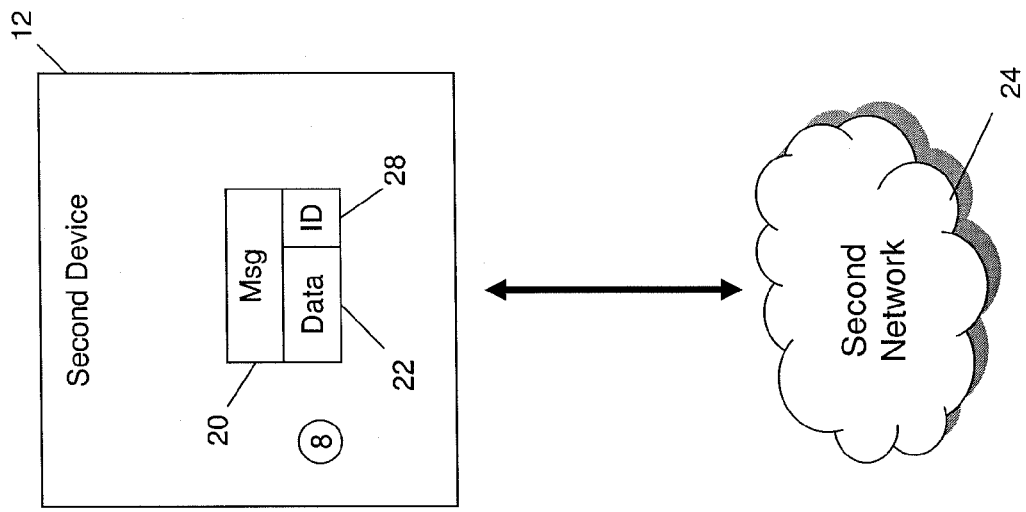
Figure 7:
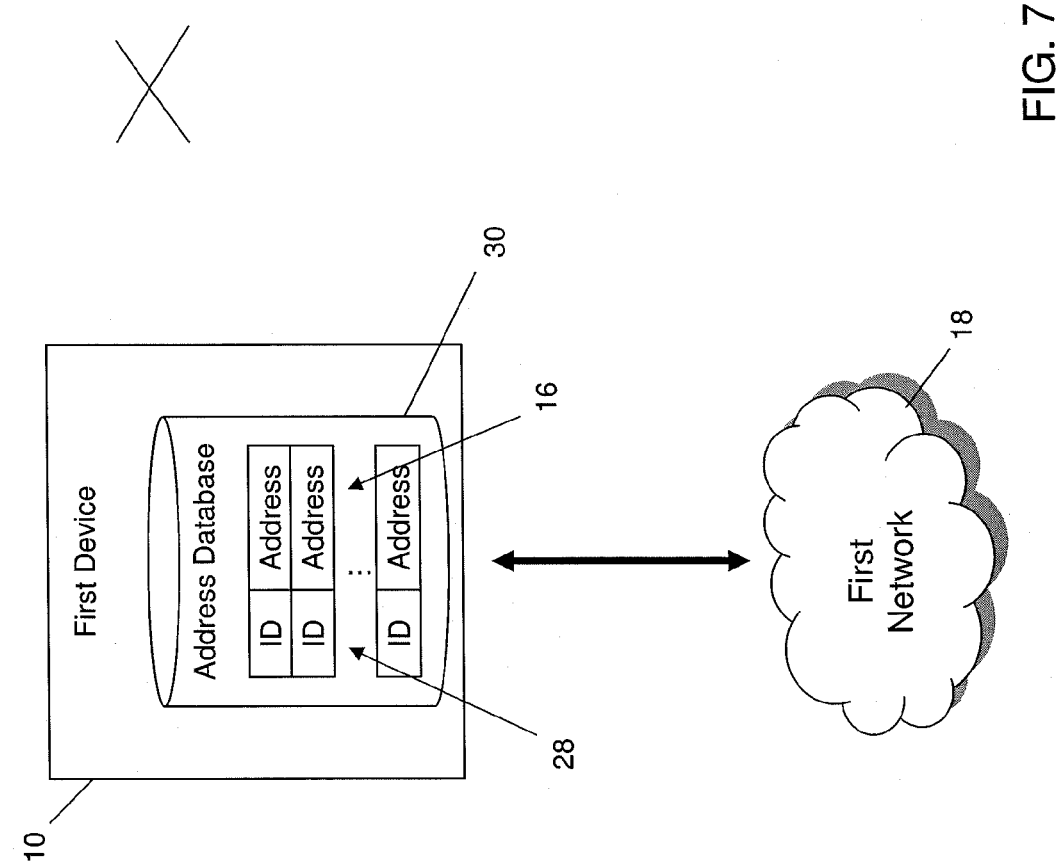
Figure 8:
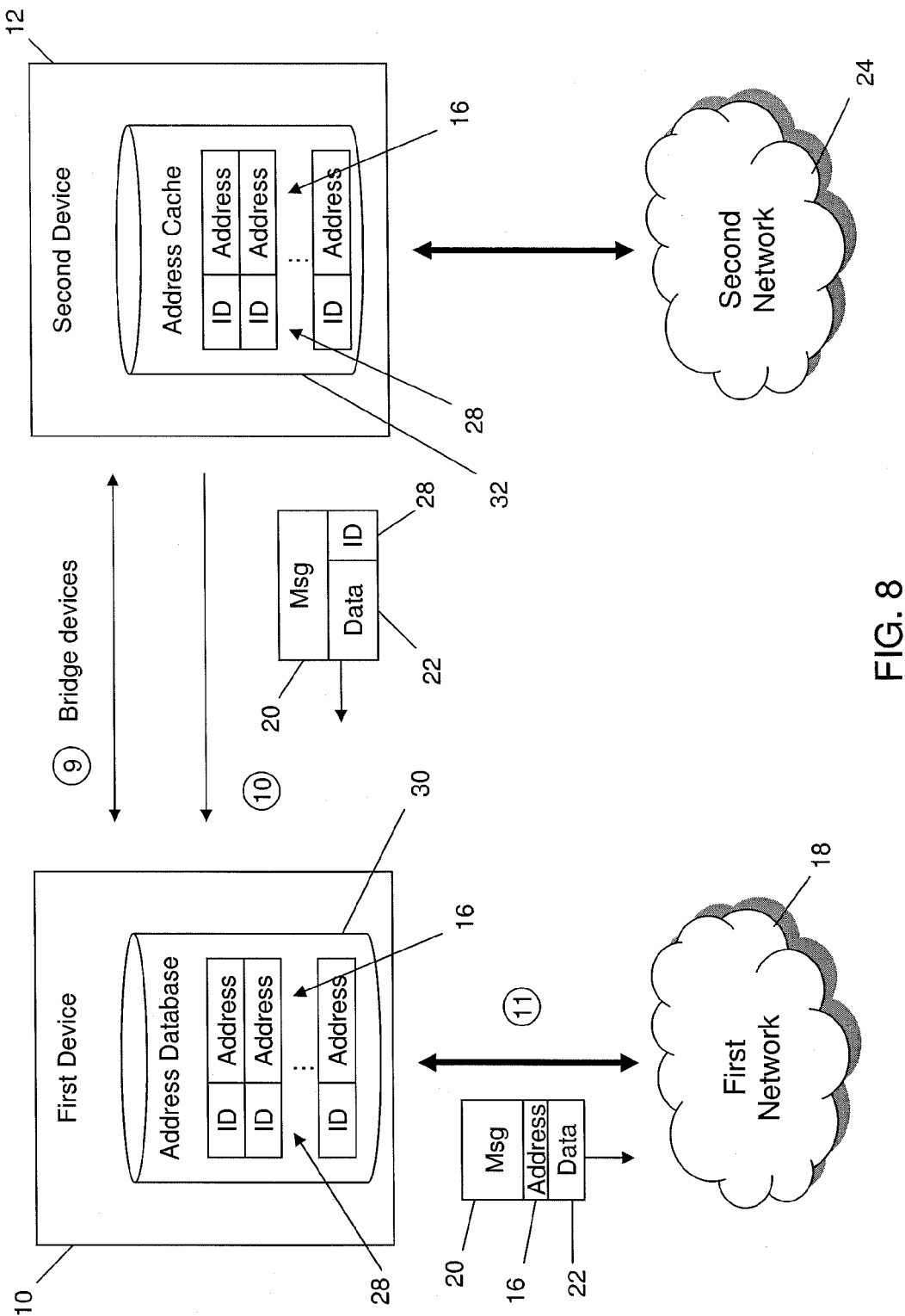

Referring now to FIG. 5, in stage 5 the bridge between the first device 10 and the second device 12 is disconnected, causing the second device 12 to delete the addresses 16 in stage 6. However, as shown in FIG. 5, the IDs 28 remain stored in the address cache 32 such that the IDs 28 may be accessed and used when the first and second devices 10, 12 are not bridged. As illustrated in FIG. 6, the second device 12 in this example obtains data 22 from a source accessible via the second network 24 (e.g., webpage content) in stage 7. In order to share the data 22 with a destination device 14 associated with one of the IDs 28 that remain in the address cache 32, the second device 12 generates a message 20 in stage 8 as shown in FIG. 7. The message 20 may be, for example, an email message attaching the data 22. By including the ID 28 associated with a desired recipient (e.g., destination device 14 shown in FIG. 1), the second device 12 may queue up the message 20 and, when the first and second devices 10, 12 are subsequently bridged, in stage 9, shown in FIG. 8, the second device 12 can transfer the message 20 to the first device 10 in stage 10, and have the first device 10 deliver the message 20 in stage 11. As shown in FIG. 8, the message 20 sent via the first network 18 by the first device 10 includes the address 28 corresponding to the ID 16 included in the message 20 provided thereto in stage 10. As also shown in FIG. 8, the address cache 32 may also be re-populated upon the first and second devices 10, 12 being re-bridged in stage 9.

By bridging the first and second devices 10, 12, a user can be provided with the ability to use the first and second devices 10, 12 cooperatively in order to, for example, interact with an application on the first device 10 using user interfaces and input methods available on the second device 12, send communications prepared on the second device 12 using the connectivity to the first network 18 provided by the first device 10, etc.

Figure 9:
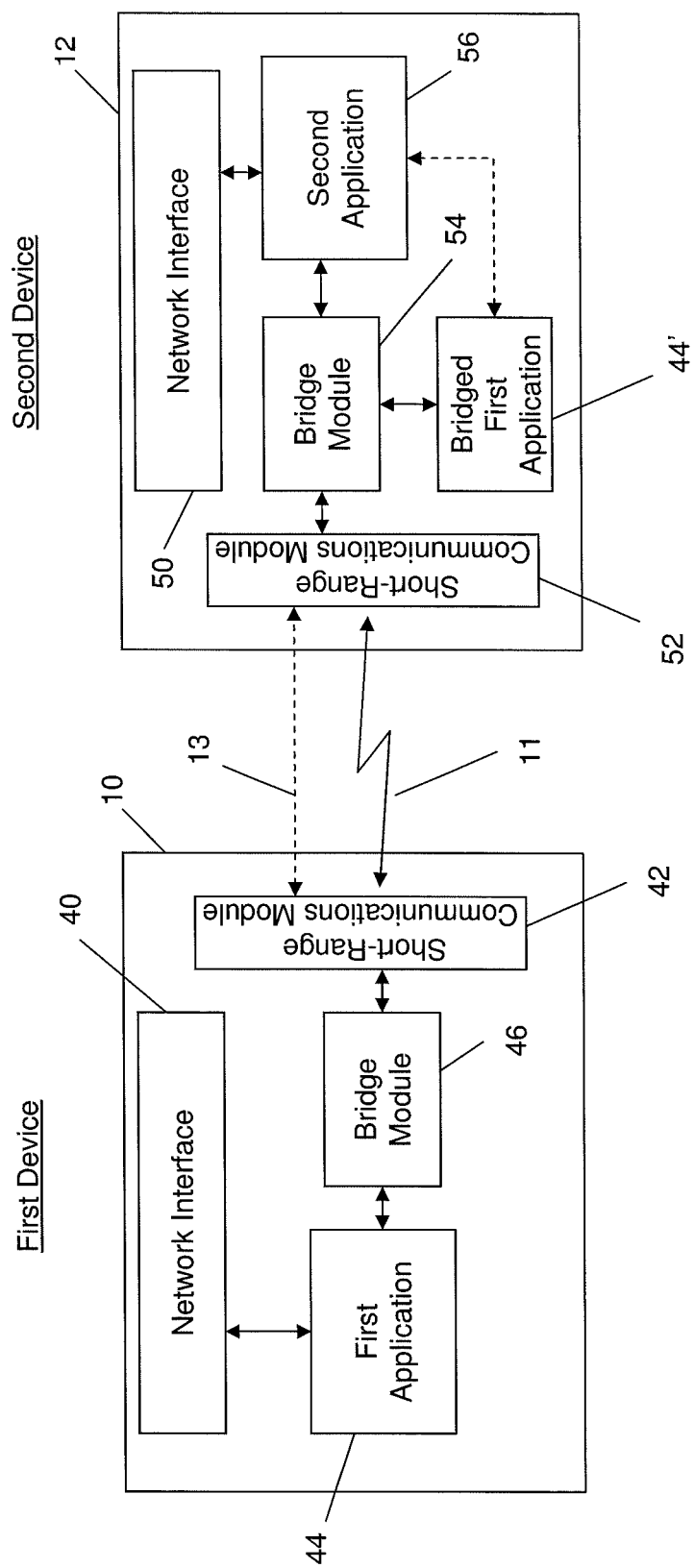
FIG. 9 is a block diagram illustrating example configurations for first and second devices that are paired to each other.

FIG. 9 illustrates example configurations for the first and second devices 10. The first device 10 in the example shown includes a network interface 40 to enable the first device 10 to access the first network 18. For example, the network interface 40 may include any one or more of a cellular radio, a Wi-Fi radio, etc. The first device 10 also includes a short-range communications module 42 for communicating with a corresponding short-range communications module 52 of the second device 12, over the wireless short-range connection 11 or a wired connection 13. For example, the short-range communications module 42 may be operable to communicate wirelessly with the short-range communications module 52 (e.g., via Bluetooth, Wi-Fi, etc.), or via the wired connection 13 (e.g., USB, Ethernet, etc.).

The first device 10 also includes a first application 44, which may represent any application, component, or service on the first device 10 that accesses the first network 18 to send or receive communications, e.g., to/from the destination device 14. A bridge module 46 is also provided on the first device 10 for bridging the first device 10 with the second device 12. It can be appreciated that the bridge module 46 may also perform a pairing with the second device 12 or such pairing may be done by another module such as the short-range communications module 42. It can be appreciated that although only the first application 44 is shown in FIG. 9, the bridge module 46 may operate on behalf of a plurality of applications 44.

The second device 12 also includes a network interface 50. The network interface 50 of the second device 12 may be similar to that used by the first device 10, e.g., if the second device 12 is also a wirelessly-enabled device, or may include other network connection capabilities, such as an ability to access the Internet or another network (e.g., the second network 24) other than the wireless network 18. The second device 12 also includes a bridge module 54 for communicating with the bridge module 46 of the first device 10 in order to participate in bridging the first and second devices 10, 12.

The second device 12 includes a bridged first application 44' which enables at least some functionality of the first application 44 to be available to a user of the second device 12. For example, messages in an email inbox for the first application 44 may be populated in a user interface for a bridged first application 44' for an email application.

The second device also includes a second application 56 which, in this example, has access to the second network 24 via the network interface 50. For example, the second application 56 may include a web browser for accessing the internet via the network access point 26.

It can be appreciated that the second device 12 shown in FIG. 9 is purely for illustrative purposes and, in some examples, may have the same configuration as the first device 10, e.g., when both the first device 10 and the second device 12 are the same type of device, e.g., smart phones, or otherwise have similar capabilities, e.g., tethered devices such as smart phones and tablet computers or other electronic devices. It may also be appreciated that the modules and functionality for the second device 12 illustrated in FIG. 9 may also be similarly provided by non-mobile devices such as the desktop computer 12" shown in FIG. 3.

Figure 11:
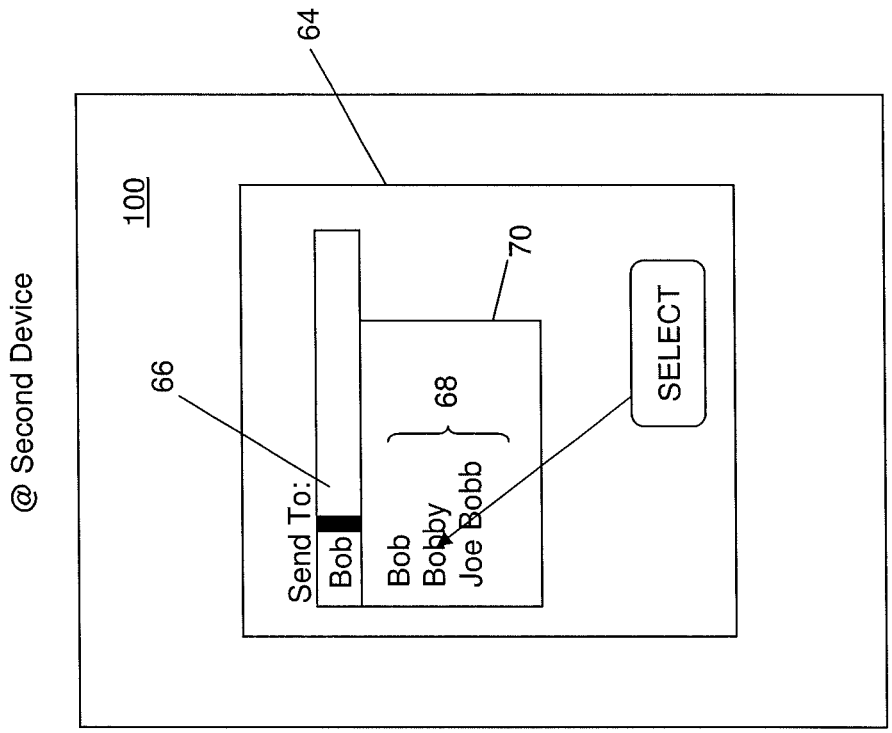
FIG. 11 is a screen shot illustrating an example user interface (UI) for selecting an identifier (ID) associated with an address for a destination device.
Figure 10:
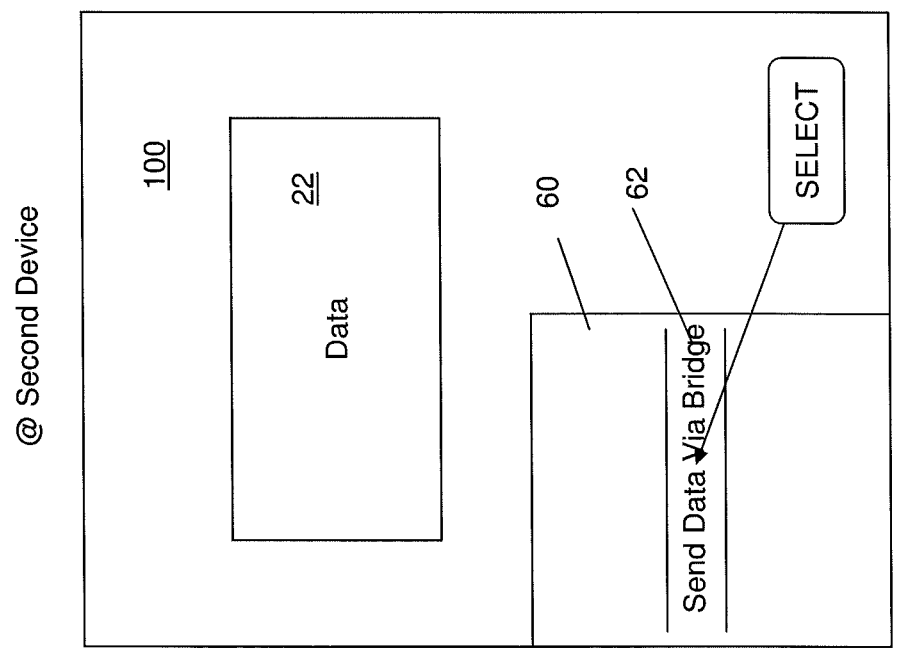
FIG. 10 is a screen shot illustrating an example menu including an option to send data over a bridged connection.

An example of a user interface 100 displayed on the second device 12 is shown in FIG. 10. The user interface 100 in this example includes data 22 that is to be provided in a communication using connectivity provided via a bridged connection to the first device 10. However, in this example, it is assumed that the bridged connection to the first device 10 has not yet been made or has otherwise been broken or disconnected. In order to operate in an offline mode, a menu 60 may be invoked in the user interface 100 and a Send Data Via Bridge option 62 selected from the menu 60. It can be appreciated that the data 22 may be highlighted and the menu 60 invoked using various input methods such as convenience buttons, touch screen gestures, etc. By selecting the option 62 as shown in FIG. 10, a message composition user interface 64 may be displayed as shown in FIG. 11. The message composition user interface 64 includes an ID selection box 66 which enables entry of text to initiate a drop-down list 70 of a filtered set 68 of IDs 28. The filtered set 68 can be obtained by accessing the address cache 32 and selecting IDs 28 that include the text entered in the ID selection box 66. Since the address cache 32 retains the IDs 28 even when the bridge is disconnected, a message 20 may still be provisionally prepared and queued for subsequent reconnection of the bridge.

Figure 13:
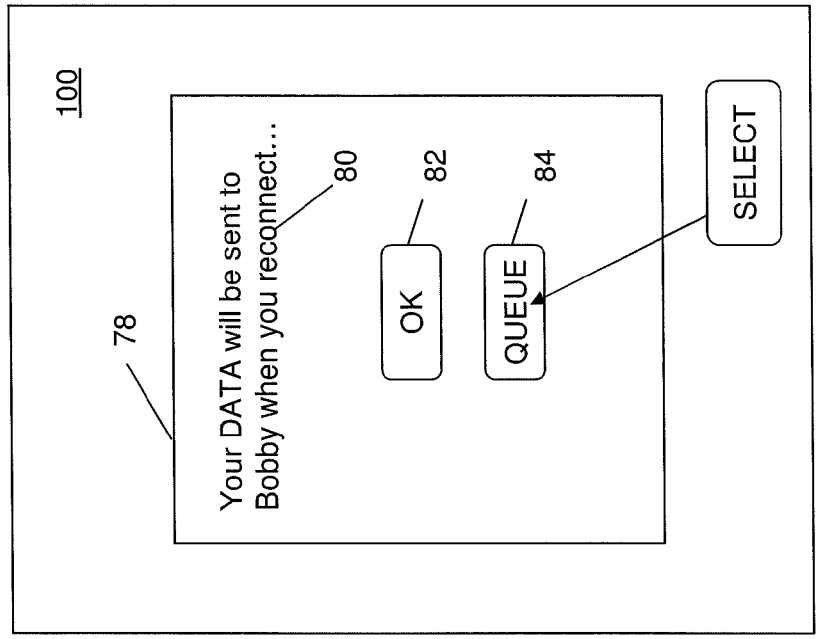
FIG. 13 is a screen shot illustrating an example UI for enabling viewing of a message queue.
Figure 12:
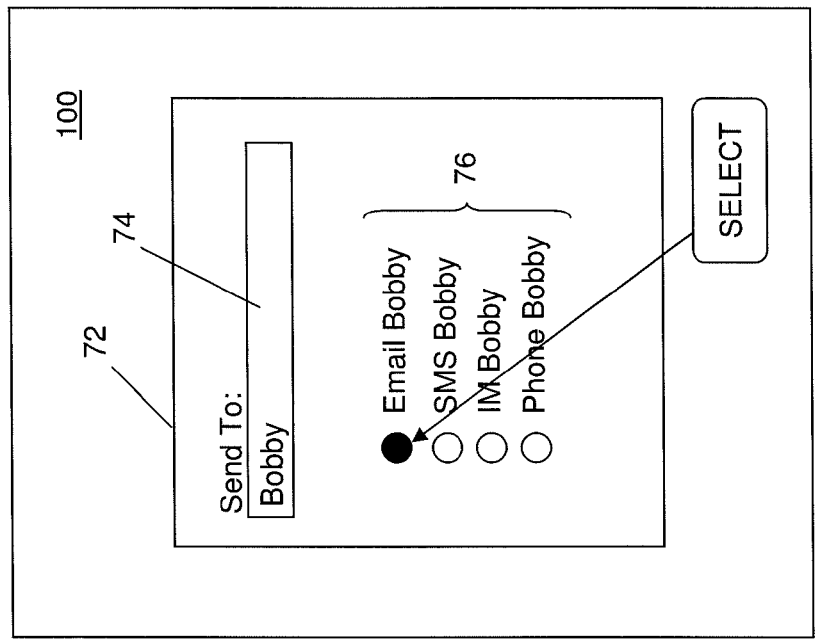
FIG. 12 is a screen shot illustrating an example UI for selecting a communication medium.
Figure 14:
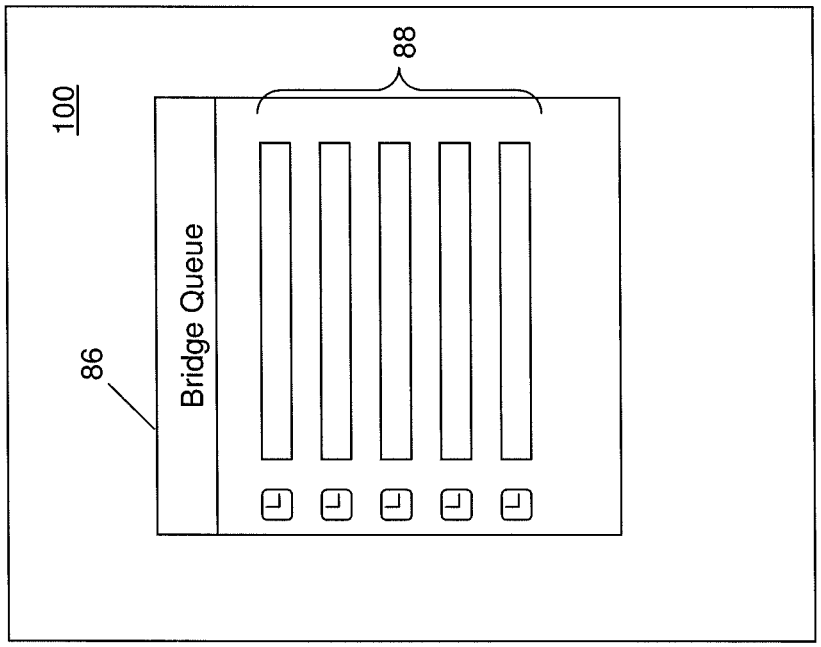
FIG. 14 is a screen shot illustrating an example UI for a message queue.

By selecting an entry in the filtered set 68 as shown in FIG. 11, a message composition user interface 72 may be displayed by the second device 12, as shown in FIG. 12. The message composition user interface 72 in this example includes a list 76 of communication media. By selecting from the list 76 as shown in FIG. 12, a corresponding bridged application 44' may be displayed (not shown), or a set of instructions generated for having the first device 10 generate a message 20 after a subsequent bridge reconnection. As shown in FIG. 13, a prompt 78 may be displayed to confirm that the data 22 will be sent when reconnected using a dialog message 80. An OK button 82 is provided to illicit confirmation of the message queuing, and a Queue button 84 is provided to enable viewing of the queue of messages. By selecting the Queue button 84 as shown in FIG. 13, a bridge queue user interface 86 may be displayed, as shown in FIG. 14. The bridge queue user interface 86 in this example includes a list of queued communications 88 that are pending until detecting a bridge reconnection. It can be appreciated that the bridged communications 88 may include messages 20 as illustrated herein, as well as various other types of communications such as links to be accessed using the first device 10 (e.g., hyperlinks), voice communications to be initiated (e.g., a phone call to phone number associated with an ID 28), etc.

Figure 15:
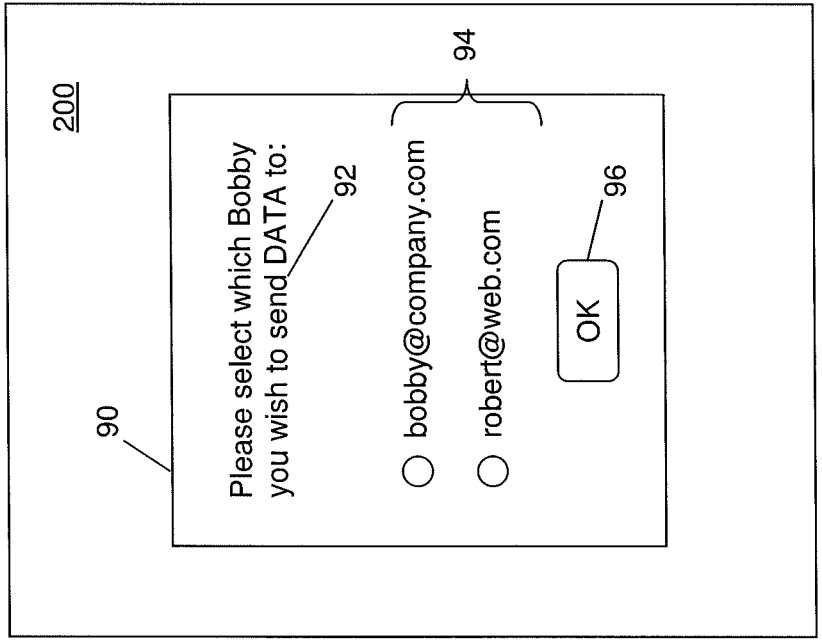
FIG. 15 is a screen shot illustrating an example UI for prompting a user to select from a plurality of address options for a selected ID.

When reconnecting the bridge between the first and second devices 10, 12, there may be scenarios wherein more than one address 16 is associated with an ID 28 provided by the second device 12, thus creating an address collision. Such a collision can occur for various reasons, including, without limitation, editing that occurs on the first device 10 while the second device 12 is disconnected. FIG. 15 illustrates an example of a user interface 200 on the first device 10 that displays an address collision prompt 90. The address collision prompt 90 provides a list of conflicting addresses 94 for the ID 28 provided. For example, the contact "Bobby" (selected in FIG. 11) may have two email addresses 28 associated with ID=Bobby. In such a scenario, the first device 10 may display the prompt 90 as shown in FIG. 15 to enable selection of a desired one of the addresses 28. An OK button 96 is also provided to enable confirmation of the selection made.

Figure 16:
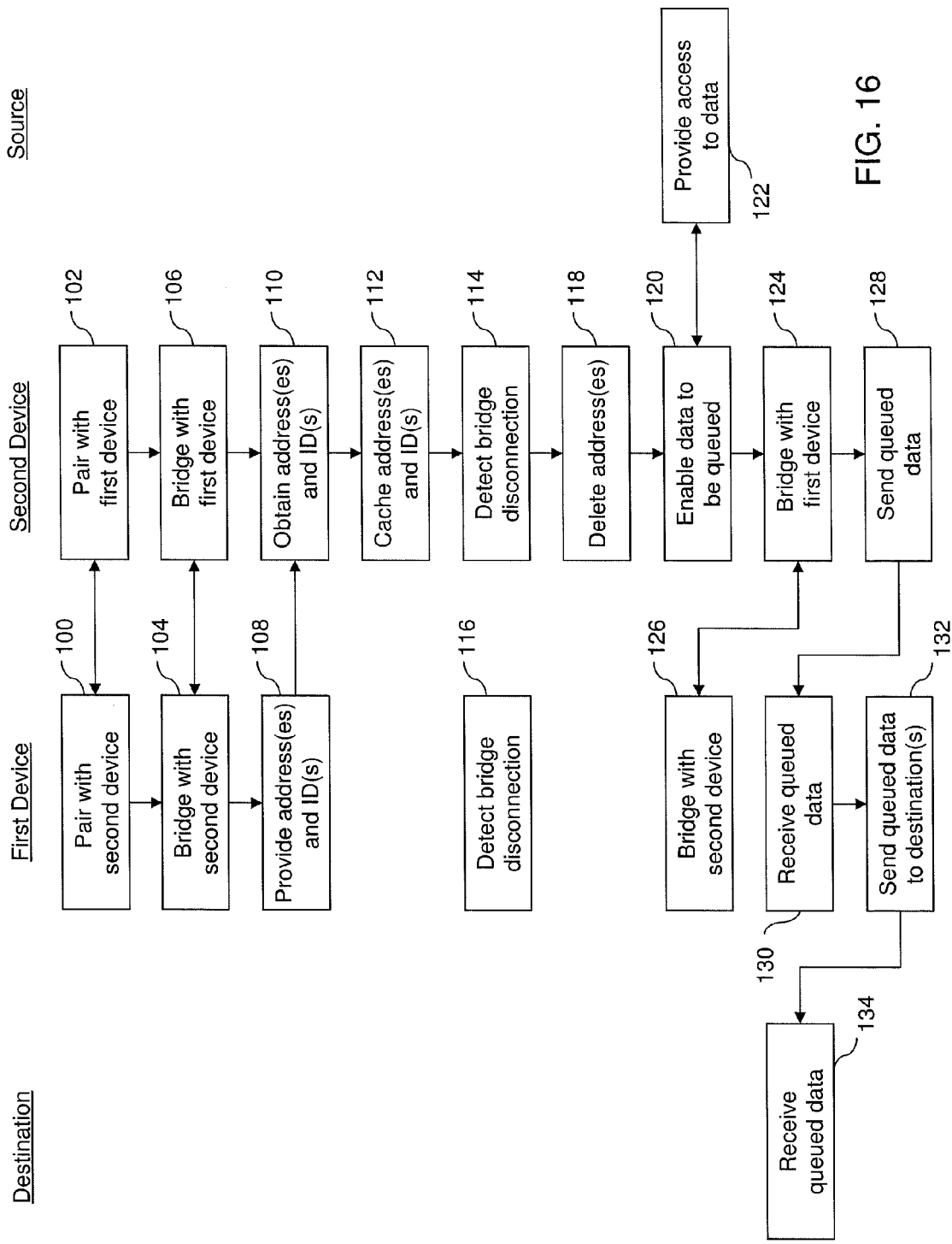
FIG. 16 is a flow chart illustrating example computer executable instructions that may be performed in enabling a first device to send data using a second device.

Referring now to FIG. 16, shown therein is a set of computer executable operations that may be performed in enabling a second device 12 to queue data 22 to be sent to a destination device 14 using the first device 10. At 100 and 102, the first device 10 and second device 12 are paired with each other. At 104 and 106, the first and second devices 10, 12 are bridged. The first device 10 provides the addresses 16 and IDs 28, at 108, which are obtained by the second device 12, at 110, and cached, at 112. At 114, the second device 12 detects a disconnection of the bridge with the first device 10, which disconnection is also detected by the first device 10, at 116. The second device 12, after detecting the disconnected bridge, deletes the addresses 16, at 118. The second device 12 thus enters an "offline" mode wherein data 22 can be queued, at 120, for subsequent transfer to the first device 10 by associating one or more IDs 28 with the data 22 being queued. In the example shown in FIG. 16, a source device 25 provides access to the data 22, at 122, e.g. by providing the data 22 on a webpage or other storage location accessible via the second network 24. It can be appreciated that the data 22 queue for subsequent transfer, at 120, may also be generated on the second device 12, transferred to the second device 12 over another medium (e.g., USB storage device), etc.

At 124, the second device 12 detects a bridge being reestablished with the first device 10, which is also detected by the first device 10, at 126. It can be appreciated that the bridging, at 124 and 126, may be initiated by either the first device 10 or the second device 12. At 128, the queued data 22 is sent to the first device 10, which is received by the first device at 130. The queued data is then sent to the one or more specified destination devices 14, at 132, by associating the IDs 28 with corresponding addresses 16. The queued data 22 is received by the destination device 14, at 134.

Figure 17:
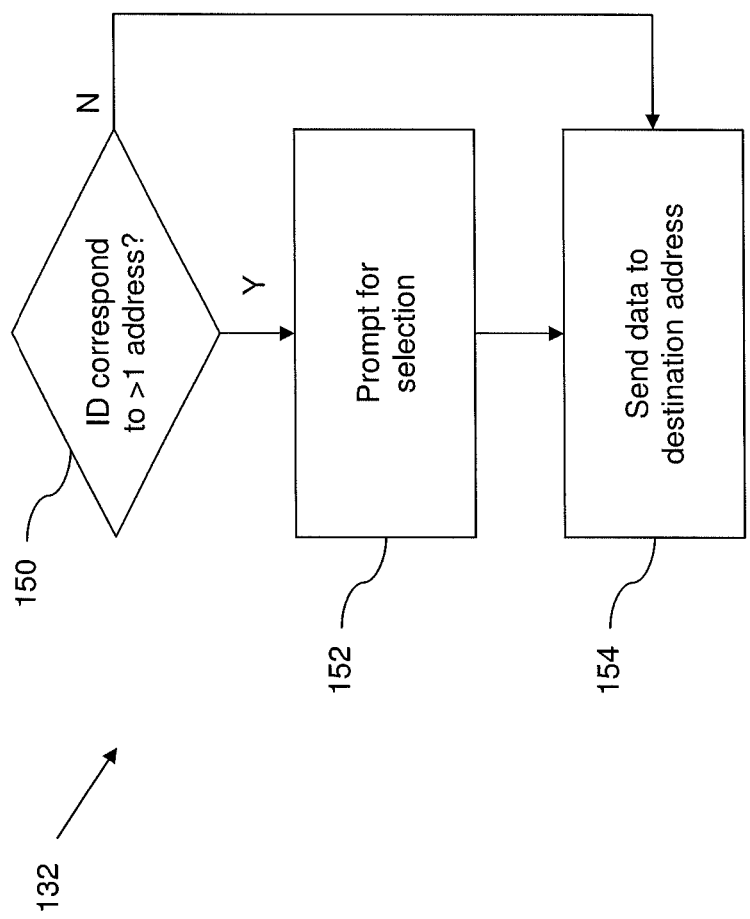
FIG. 17 is a flow chart illustrating example computer executable instructions that may be performed in determining if an address collision exists.

As discussed above, an ID 28 provided with the queued data 22 may have more than one address 16 associated therewith. To resolve potential address collisions, the first device 10 may perform the computer executable operations illustrated in FIG. 17, e.g., during operation 132 shown in FIG. 16. Referring to FIG. 17, the first application 44 (or bridge module 46) determines, at 150, whether or not an ID 28 included in a queued message 20 corresponds to more than one address 16. If so, a prompt 90 such as that shown in FIG. 15 may be displayed, at 152, to obtain selection of a desired one of the multiple possible addresses 16. The data 22 may then be sent to the destination address 16, at 154.

Accordingly, there is provided a method of enabling a communication for a second device using a first device, the method comprising: the second device detecting a first connection with the first device; the second device obtaining from the first device via the first connection, a first set of one or more addresses and a second set of one or more identifiers associated with respective ones of the one or more addresses; the second device detecting disconnection of the first connection with the first device; the second device deleting the first set; the second device enabling one or more identifiers from the second set to be associated with data to be transferred to the first device; the second device detecting a second connection with the first device; and the second device sending the data and associated one or more identifiers to the first device to have the first device to send the communication using corresponding one or more addresses.

There is also provided a computer readable storage medium comprising computer executable instructions for enabling a communication for a second device using a first device, the computer executable instructions comprising instructions for: the second device detecting a first connection with the first device; the second device obtaining from the first device via the first connection, a first set of one or more addresses and a second set of one or more identifiers associated with respective ones of the one or more addresses; the second device detecting disconnection of the first connection with the first device; the second device deleting the first set; the second device enabling one or more identifiers from the second set to be associated with data to be transferred to the first device; the second device detecting a second connection with the first device; and the second device sending the data and associated one or more identifiers to the first device to have the first device to send the communication using corresponding one or more addresses.

There is also provided a second device comprising a processor and memory, the memory comprising computer executable instructions for enabling a communication for the second device using a first device, the computer executable instructions comprising instructions for: the second device detecting a first connection with the first device; the second device obtaining from the first device via the first connection, a first set of one or more addresses and a second set of one or more identifiers associated with respective ones of the one or more addresses; the second device detecting disconnection of the first connection with the first device; the second device deleting the first set; the second device enabling one or more identifiers from the second set to be associated with data to be transferred to the first device; the second device detecting a second connection with the first device; and the second device sending the data and associated one or more identifiers to the first device to have the first device to send the communication using corresponding one or more addresses.

There is also provided a method of enabling a communication for a second device using a first device, the method comprising: the first device detecting a first connection with the second device; the first device providing to the second device via the first connection, a first set of one or more addresses and a second set of one or more identifiers associated with respective ones of the one or more addresses; the first device detecting a second connection subsequent to a disconnection of the first connection with the second device; the first device receiving from the second device, data and one or more associated identifiers from the first set; the first device determining corresponding one or more addresses to the one or more associated identifiers; and the first device sending the communication using the corresponding one or more addresses.

There is also provided a computer readable storage medium comprising computer executable instructions for enabling a communication for a second device using a first device, the computer executable instructions comprising instructions for: the first device detecting a first connection with the second device; the first device providing to the second device via the first connection, a first set of one or more addresses and a second set of one or more identifiers associated with respective ones of the one or more addresses; the first device detecting a second connection subsequent to a disconnection of the first connection with the second device; the first device receiving from the second device, data and one or more associated identifiers from the first set; the first device determining corresponding one or more addresses to the one or more associated identifiers; and the first device sending the communication using the corresponding one or more addresses.

There is also provided a first device comprising a processor and memory, the memory comprising computer executable instructions for enabling a communication for a second device using the first device, the computer executable instructions comprising instructions for: the first device detecting a first connection with the second device; the first device providing to the second device via the first connection, a first set of one or more addresses and a second set of one or more identifiers associated with respective ones of the one or more addresses; the first device detecting a second connection subsequent to a disconnection of the first connection with the second device; the first device receiving from the second device, data and one or more associated identifiers from the first set; the first device determining corresponding one or more addresses to the one or more associated identifiers; and the first device sending the communication using the corresponding one or more addresses.

Figure 18:
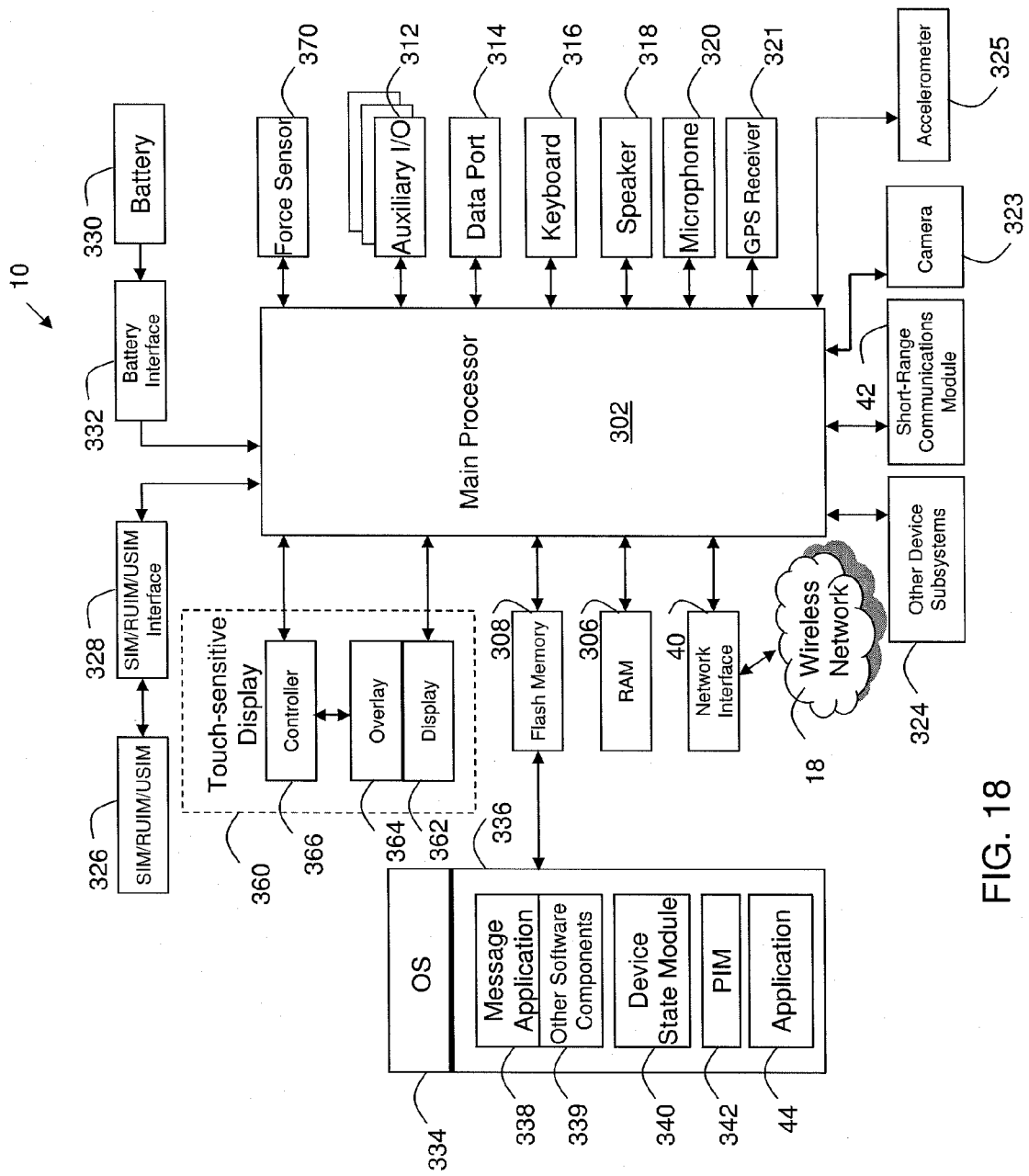
FIG. 18 is a block diagram of an example of a configuration for a mobile device.

Referring to FIG. 18, to further aid in the understanding of the example first and second devices 10, 12 described above, shown therein is a block diagram of an example configuration of a mobile first device 10. It can be appreciated that the same configuration may apply to a mobile second device 12 in at least some examples. The mobile device 10 includes a number of components such as a main processor 302 that controls the overall operation of the mobile device 10. Communication functions, including data and voice communications, are performed through a network interface 40. The network interface 40 receives messages from and sends messages to a wireless network 18. In this example of the mobile device 10, the network interface 40 is configured in accordance with the GSM and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the network interface 40 with the wireless network 18 represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316 (physical, virtual, or both), a speaker 318, a microphone 320, a GPS receiver 321, short-range communications module 42, a camera 323, an accelerometer 325 and other device subsystems 324. Some of the subsystems of the mobile device 10 perform communication-related functions, whereas other subsystems may provide "resident" or on-device functions. By way of example, the display 360 and the keyboard 316 may be used for both communication-related functions, such as entering a text message for transmission over the wireless network 18, and device-resident functions such as a calculator or task list. In one example, the mobile device 10 can include a non touch-sensitive display in place of, or in addition to the touch-sensitive display 360. For example the touch-sensitive display 360 can be replaced by a display 362 that may not have touch-sensitive capabilities.

The mobile device 10 can send and receive communication signals over the wireless network 18 after required network registration or activation procedures have been completed. Network access is associated with a subscriber or user of the mobile device 10. To identify a subscriber, the mobile device 10 may use a subscriber module component or "smart card" 326, such as a SIM, a Removable User Identity Module (RUIM) and a Universal Subscriber Identity Module (USIM).

In the example shown, a SIM/RUIM/USIM 326 is to be inserted into a SIM/RUIM/USIM interface 328 in order to communicate with a network.

The mobile device 10 is typically a battery-powered device and includes a battery interface 332 for receiving one or more rechargeable batteries 48. In at least some examples, the battery 330 can be a smart battery with an embedded microprocessor. The battery interface 332 is coupled to a regulator (not shown), which assists the battery 330 in providing power to the mobile device 10. Although current technology makes use of a battery, future technologies such as micro fuel cells may provide the power to the mobile device 10.

The mobile device 10 also includes an operating system 334 and software components 336 to 342, 44, and 46. The operating system 334 and the software components 336 to 342, 44, and 46 that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 342, 44, and 46 such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Software applications may include a message application 338, a device state module 340, a Personal Information Manager (PIM) 342, and an application 44. A message application 338 can be any suitable software program that allows a user of the mobile device 10 to send and receive electronic messages, wherein messages are typically stored in the flash memory 308 of the mobile device 10. A device state module 340 provides persistence, i.e. the device state module 340 ensures that important device data is stored in persistent memory, such as the flash memory 308, so that the data is not lost when the mobile device 10 is turned off or loses power. A PIM 342 includes functionality for organizing and managing data items of interest to the user, such as, but not limited to, e-mail, contacts, calendar events, and voice mails, and may interact with the wireless network 18.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 18, the auxiliary I/O subsystem 312, the data port 314, the short-range communications module 42, or any other suitable device subsystem 324.

The data port 314 can be any suitable port that enables data communication between the mobile device 10 and another computing device. The data port 314 can be a serial or a parallel port. In some instances, the data port 314 can be a USB port that includes data lines for data transfer and a supply line that can provide a charging current to charge the battery 330 of the mobile device 10.

For voice communications, received signals are output to the speaker 318, and signals for transmission are generated by the microphone 320. Although voice or audio signal output is accomplished primarily through the speaker 318, the display 362 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 362 of the touch-sensitive display 360 may include a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

In some examples, an optional force sensor 370 or force sensors is disposed in any suitable location, for example, between the touch-sensitive display 360 and a back of the mobile device 10 to detect a force imparted by a touch on the touch-sensitive display 360. The force sensor 370 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the first device 10, the second device 12, any component of or related to the networks 18, 24, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of enabling a communication for a second device using a network connection of a first device, the method comprising:
   the second device detecting a first pairing with the first device;
   the second device obtaining from the first device via the first pairing, a first set of one or more addresses and a second set of one or more identifiers, each identifier in the second set being associated with a respective one of the one or more addresses in the first set;
   the second device detecting disconnection of the first pairing with the first device;
   the second device deleting the first set;
   the second device enabling one or more identifiers from the second set to be associated with data to be transferred to the first device;
   the second device detecting a second pairing with the first device to use the network connection of the first device; and
   the second device sending at least the data and selected one or more identifiers to the first device to have the first device to send the communication to at least one third device over the network connection of the first device by replacing the selected one or more identifiers with corresponding one or more addresses.

2. The method of claim 1, the first pairing providing access to a first application on the first device.

3. The method of claim 1, the data being obtained using a second application on the second device.

4. The method of claim 3, the communication to be sent by the first device via a first network, and the second application enabling connectivity with a second network.

5. The method of claim 1, the data being generated on the second device.

6. The method of claim 1, further comprising adding the data to be transferred to a queue and retaining the data to be transferred in the queue at least until the second pairing is established.

7. A method of enabling a communication for a second device using a network connection of a first device, the method comprising:
   the first device detecting a first pairing with the second device;
   the first device providing to the second device via the first pairing, a first set of one or more addresses and a second set of one or more identifiers, each identifier in the second set being associated with a respective one of the one or more addresses in the first set;
   the first device detecting a second pairing with the second device to enable the second device to use the network connection of the first device, subsequent to a disconnection of the first pairing with the second device;
   the first device receiving from the second device, at least data and selected one or more identifiers from the first set;
   the first device replacing the selected one or more identifiers with corresponding one or more addresses; and
   the first device sending the communication to at least one third device over the network connection of the first device, using the corresponding one or more addresses.

8. The method of claim 7, further comprising:
   determining that at least one of the identifiers has more than one associated address; and
   displaying a prompt for selection of a desired one of the more than one associated address.

9. The method of claim 7, the first pairing providing access to a first application on the first device.

10. The method of claim 9, the communication being sent by the first device via a first network, and a second application enabling connectivity with a second network.

11. The method of claim 7, further comprising receiving a queue including the data and at least one additional communication to be sent by the first device.

12. The method of claim 7, the first pairing comprising a wireless short-range connection between the first device and the second device.

13. A non-transitory computer readable storage medium comprising computer executable instructions for enabling a communication for a second device using a network connection of a first device, the computer executable instructions comprising instructions for:
   the second device detecting a first pairing with the first device;
   the second device obtaining from the first device via the first pairing, a first set of one or more addresses and a second set of one or more identifiers, each identifier in the second set being associated with a respective one of the one or more addresses in the first set;
   the second device detecting disconnection of the first pairing with the first device;
   the second device deleting the first set;
   the second device enabling one or more identifiers from the second set to be associated with data to be transferred to the first device;
   the second device detecting a second pairing with the first device to use the network connection of the first device; and
   the second device sending at least the data and selected one or more identifiers to the first device to have the first device to send the communication to at least one third device over the network connection of the first device by replacing the selected one or more identifiers with corresponding one or more addresses.

14. The non-transitory computer readable medium of claim 13 further comprising instructions for adding the data to be transferred to a queue and retaining the data to be transferred in the queue at least until the second pairing is established.

15. A second device comprising a processor and memory, the memory comprising computer executable instructions for enabling a communication for the second device using a network connection of a first device, the computer executable instructions comprising instructions for:
   the second device detecting a first pairing with the first device;
   the second device obtaining from the first device via the first pairing, a first set of one or more addresses and a second set of one or more identifiers, each identifier in the second set being associated with a respective one of the one or more addresses in the first set;
   the second device detecting disconnection of the first pairing with the first device;
   the second device deleting the first set;
   the second device enabling one or more identifiers from the second set to be associated with data to be transferred to the first device;

the second device detecting a second pairing with the first device to use the network connection of the first device; and the second device sending at least the data and selected one or more identifiers to the first device to have the first device to send the communication to at least one third device over the network connection of the first device by replacing the selected one or more identifiers with corresponding one or more addresses.

16. The second device of claim 15 further comprising instructions for adding the data to be transferred to a queue and retaining the data to be transferred in the queue at least until the second pairing is established.

17. A non-transitory computer readable storage medium comprising computer executable instructions for enabling a communication for a second device using a network connection of a first device, the computer executable instructions comprising instructions for:
- the first device detecting a first pairing with the second device;
- the first device providing to the second device via the first pairing, a first set of one or more addresses and a second set of one or more identifiers, each identifier in the second set being associated with a respective one of the one or more addresses in the first set;
- the first device detecting a second pairing with the second device to enable the second device to use the network connection of the first device, subsequent to a disconnection of the first pairing with the second device;
- the first device receiving from the second device, at least data and selected one or more identifiers from the first set;
- the first device replacing the selected one or more identifiers with corresponding one or more addresses; and
- the first device sending the communication to at least one third device over the network connection of the first device, using the corresponding one or more addresses.

18. The non-transitory computer readable medium of claim 17 further comprising instructions for receiving a queue including the data and at least one additional communication to be sent by the first device.

19. A first device comprising a processor and memory, the memory comprising computer executable instructions for enabling a communication for a second device using a network connection of the first device, the computer executable instructions comprising instructions for:
- the first device detecting a first pairing with the second device;
- the first device providing to the second device via the first pairing, a first set of one or more addresses and a second set of one or more identifiers, each identifier in the second set being associated with a respective one of the one or more addresses in the first set;
- the first device detecting a second pairing with the second device to enable the second device to use the network connection of the first device, subsequent to a disconnection of the first pairing with the second device;
- the first device receiving from the second device, at least data and selected one or more identifiers from the first set;
- the first device replacing the selected one or more identifiers with corresponding one or more addresses; and
- the first device sending the communication to at least one third device over the network connection of the first device, using the corresponding one or more addresses.

20. The first device of claim 19 further comprising instructions for receiving a queue including the data and at least one additional communication to be sent by the first device.

* * * * *